United States Patent [19]
Ahl et al.

[11] Patent Number: 5,448,753
[45] Date of Patent: Sep. 5, 1995

[54] WIDE AREA RADIO COMMUNICATION NETWORK SYSTEM AND METHOD

[76] Inventors: Karl-Axel Ahl, Nybogatan 18, S-212 32 Malmo; Joakim Nelson, Skanevagen 26, S-222 70 Lund, both of Sweden

[21] Appl. No.: 104,944

[22] Filed: Aug. 12, 1993

Related U.S. Application Data

[63] Continuation of Ser. No. 689,773, May 2, 1991, abandoned.

[30] Foreign Application Priority Data

Sep. 5, 1988 [SE] Sweden ................ 8803094

[51] Int. Cl.6 ................................ H04B 7/26
[52] U.S. Cl. .................... 455/33.1; 455/25; 455/33.3; 455/34.1
[58] Field of Search ............. 455/16, 33.1–33.4, 455/34.1, 25, 51.1, 51.2, 56.1, 63; 342/359, 367; 370/58.1, 59, 85.7, 85.8

[56] References Cited

U.S. PATENT DOCUMENTS

| | | | |
|---|---|---|---|
| 4,107,609 | 8/1978 | Gruenberg | 455/25 |
| 4,144,496 | 3/1979 | Cummingham et al. | 325/53 |
| 4,414,661 | 11/1983 | Karlstrom | 455/33 |
| 4,625,308 | 11/1986 | Kim et al. | 370/104 |
| 4,633,463 | 12/1986 | Mack | 455/56 |
| 4,686,672 | 8/1987 | Namiki | 370/95 |
| 4,696,027 | 9/1987 | Bonta | 379/60 |
| 4,696,053 | 9/1987 | Mastriani et al. | 455/25 |
| 4,698,803 | 10/1987 | Haselton et al. | 370/60 |
| 4,755,992 | 7/1988 | Albal | 370/94 |
| 4,759,051 | 7/1988 | Han | 379/59 |
| 4,797,947 | 1/1989 | Labedz | 455/33.3 |
| 5,067,147 | 11/1991 | Lee | 379/60 |

FOREIGN PATENT DOCUMENTS

0201254A3 11/1986 European Pat. Off.
2165127 4/1986 United Kingdom.

OTHER PUBLICATIONS

Cox & Reudink, Dynamic Channel Assignment in High–Capactiy Mobile Communications Systems, 1971, USA.

Sundberg, Alternative Cell Configurations for Digital Mobile Radio Systems, Sep. 1983, USA.

*Primary Examiner*—Reinhard J. Eisenzopf
*Assistant Examiner*—Chi H. Pham
*Attorney, Agent, or Firm*—Gunn, Lee & Miller

[57] ABSTRACT

A method and system in a wide area radio communications network. The network has at least two central stations, each central station being assigned to at least one peripheral station. According to the method radio transmission at specific frequencies between stations positioned along an arbitrary line is coordinated during all time intervals. The stations are provided with timers, transmitters and receivers for transmitting and receiving during predetermined time intervals in a predetermined direction.

20 Claims, 16 Drawing Sheets

WIDE AREA RADIO COMMUNICATION NETWORK SYSTEM AND METHOD

This is a continuation of application Ser. No. 07/689,773 filed on May 2, 1991, now abandoned, and Int. Application No. PCT/SE89/00470 filed on Sep. 5, 1989, and which designated the U.S.

BACKGROUND OF THE INVENTION

The invention relates to a method and a system in a wide area radio communication network, comprising at central stations, each cental station being assigned to one or more peripheral station.

To make possible for a plurality of users of wide area mobile or stationary radio systems to utilize common communication resources methods of time and/or frequency sharing (e.g. TDMA, ALOHA, CSMA, Polling, FDMA) have been developed. The first method developed was frequency sharing. The Nordic mobile telephone system NMT is based on this method. According to the frequency sharing method the users are allocated a certain channel at a certain frequency during the communication. Time sharing is a more modern method.

Digital wide area systems normally use time sharing, some times in combination with frequency sharing.

A drawback of the prior art methods for sharing resources is that the central station disposed in the center of the area must be able continuously to reach the peripheral stations spread out in each cell area or sector (e.g. within 360° or 90°.; see FIGS. 1 and 2).

The quality of digitally transmitted signals is effected by reflection and diffraction, see FIG. 3. By using omni directional or sector directional antennas the transmission capacity is limited. This is a difficult problem especially in mobile systems.

Another drawback in current systems is that an ongoing information process between two stations results in transmission and reception in undesired directions. Small cell configurations such as those shown in FIG. 4 are common in radio area networks.

EP,A3,0201254 discloses a more developed radio communication system which utilizes spot beams, time division multiple access, and frequency-use to provide communication service from a central station to remote customers within a system service region. The central station provides multistage switching on intermediate frequency level to form a spotted beam in different directions so as to permit the respective sharing of radio transmitters and receivers over a major number of antenna transmitting and receiving ports. At the super central station, each section of the service area is covered by a different one of a raster of spot beams which are switched in accordance with a TDMA frame. A small number of transmission frequencies are re-used by different spot beams. The signal output energy is constant, regardless of the distance between the central station and the customer stations.

An object of the present invention is to overcome limitations and drawbacks of the prior art systems mentioned above. Another object of the present invention is to minimize interference between stations and to minimize the total power consumption of the system.

SUMMARY OF THE INVENTION

The present invention of a method of operating in a wide area radio communications network has the steps of providing at least two central stations, each of the central stations being assigned to at least one peripheral station. During all time intervals, radio transmission is coordinated at specific frequencies between stations positioned along an arbitrary line by generating in the central stations time coordination signals. Coordination data is determined in advance and provided at the central stations. Information transfer coordination is arranged between subsystems along with dynamical changes using quality detection codes. In a central station information concerning the location of stations disposed at predetermined distances from the central station is stored. Transmission direction and transmission intervals of the peripheral stations assigned to the central station is calculated from the information. Each of the peripheral stations stores the transmission data.

BRIEF DESCRIPTION OF THE DRAWINGS

In order to explain the invention embodiments thereof will be described in more detail below with reference to the accompanying drawings, wherein.

DETAILED DESCRIPTION OF THE PREFERRED EMBODIMENT

Figure 5:
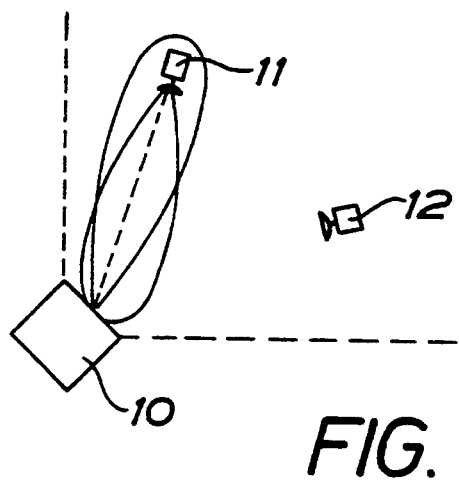
Figure 6:
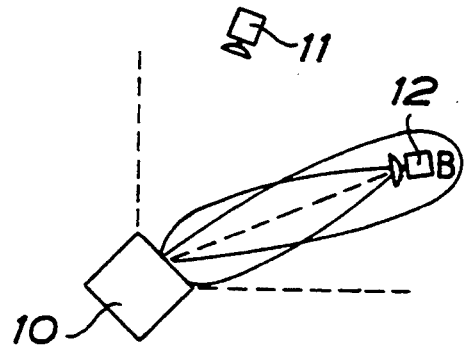

The information transmission between two stations in a prior art system using spotted beams takes place during a specific time interval or time slot, many slots constituting a frame, and in a specific direction. The transmission is normally repeated continuously. With reference to FIGS. 5 and 6 it is clear that when transmission is taking place between two stations, the stations are directed towards each other with regard to the transmitting as well as the receiving direction.

Figure 7:
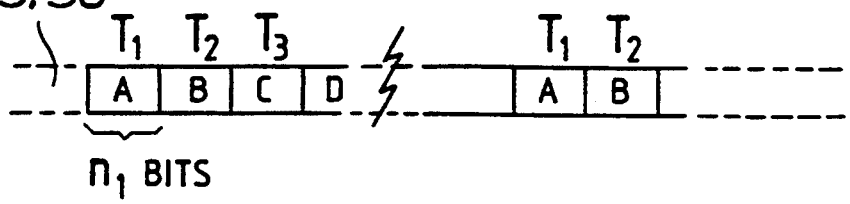
FIG. 7 shows a timing sequence in the system shown in FIGS. 5 and 6.

The time diagram in FIG. 7 shows how the transmission between stations is divided into frames or time intervals.

Figure 8:
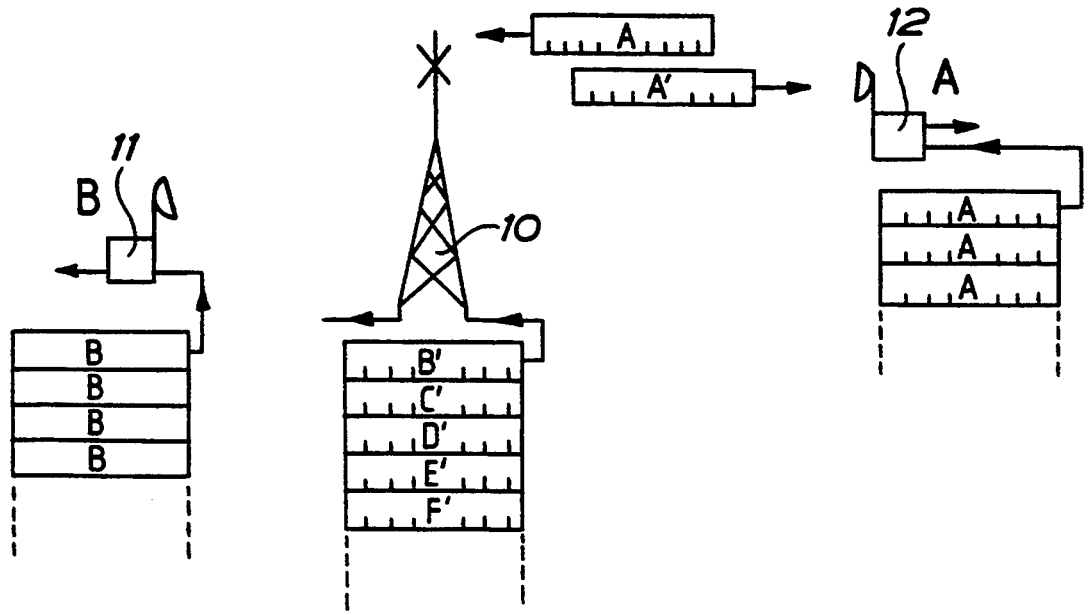
FIG. 8 is a representation of the buffering principle which takes place in the system according to FIGS. 5 and 6.

When the information flow is continuous the information is transmitted as packets in time slots which are stored and rebuilt at the receiving unit and then retransmitted from the system in the original shape. The transmission is transparent to the user. There is a certain delay in transmission mainly caused by the package transmission. Buffering and the rebuilding, see FIG. 8, in which 11 and 12 are references for peripheral stations and 10 for a central station. The time delay between each package or the repeated time slot in a frame is adjusted to the time delay acceptable in connected services. In public telephone networks a delay of up to 50 ms may be acceptable.

The wide area telecommunication, system according to the invention is intended for all types and combinations of telecommunication services, such as analog and digital telephone transmission, high quality sound and image transmission, low-speed asynchronous data transmission and synchronous data transmission, all services in corporation with other types of networks and services.

It is also possible to implement the system according to the invention for a specific service or for a specific combination of services. During the transmission phase the antenna of a central station is always directed towards a specific peripheral station, but a peripheral station may under certain circumstances, such as in mobile applications, utilize an omni directional antenna and/or a adaptive directional antenna.

Each station dynamically and continuously redirects itself to the next station in turn for transmission. To keep the system capacity high the redirection delay is made very short in relation to the time of the timeslots. In the system according to the invention the redirection time delays are about or less than 1 microsecond which means that the time losses due to redirection are marginal. At a channel capacity of 2 Mbite/s and 50 active stations less than 1 percent of transmission time is lost due to the redirection.

The system according to the invention is intended for stationary peripheral stations as well as mobile type peripheral stations. In a system comprising stationary peripheral stations the geographical position of each of the stations is stored. Position data are utilized when the central stations calculate and control the peripheral stations transmitting and receiving direction, time assignment according to traffic demand and timing in other subsystems, power and when applicable carrier frequency in order to optimize capacity and quality and minimize interferance. When a new station is connected or an active station is disconnected the system automatically recalculates transmission control data. Central stations use time slots in the frames during which the area covered by that central station is scanned to locate and identify any new station added and any previous active station disconnected or reconnected. Basically a central station of the system has three basic states or modes:

A) Identifying stations and compensating for distance variations, for correct timing and power control.
B) Controlling station traffic.
C) Transferring user and system information.
Optionally the system performs also:
D) Scanning for identifying non-active and new stations and the locations thereof.

Figure 9:
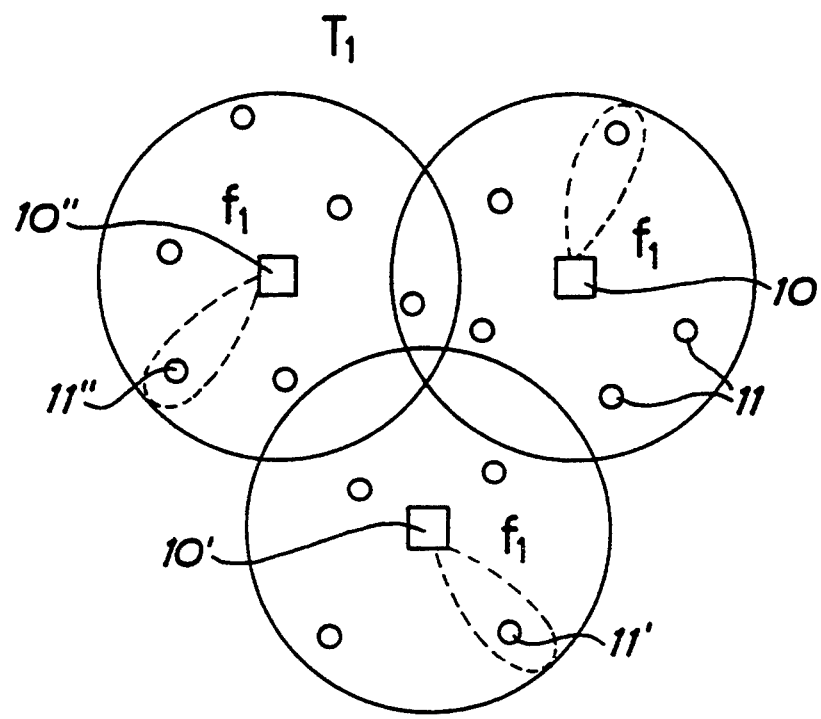
FIG. 9 is a view from above of an embodiment of a system according to the invention during a specific time interval.
Figure 10:
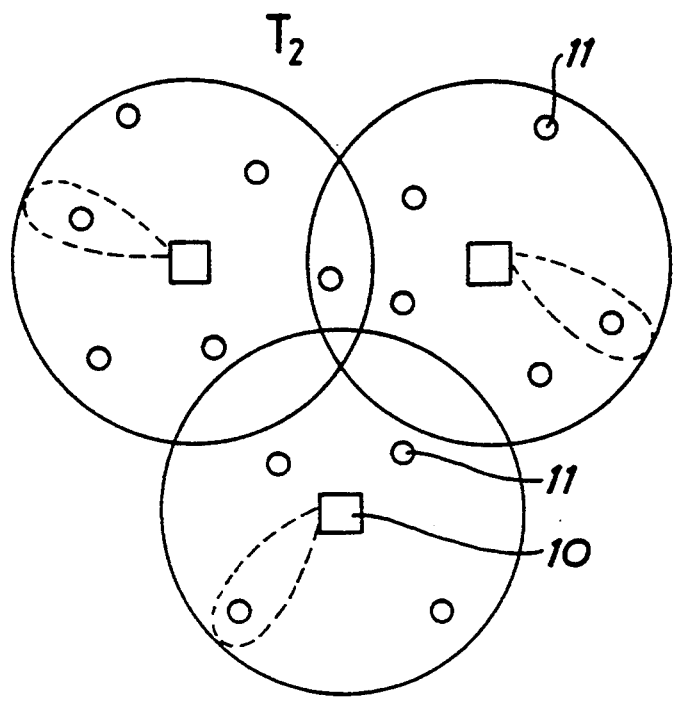
FIG. 10 shows the system in FIG. 9 during another time interval.

The system includes a central station antenna which is directed towards one specific peripheral station during short time intervals during which information is transferred, so as to achieve optimized signal strengths and minimized interference for the normal information exchange. The information exchange which is well defined in time as well as in direction makes possible a simultaneous reuse of the frequency in the vicinity of said stations, as long as the transimission direction during that time interval is different. From FIGS. 9 and 10 it is apparent how three different central stations 10, 10', 10" can transmit to three different peripheral stations 11, 11', 11" and use the same frequency $f_1$. This is possible because of the highly directed antenna system, of the central station and because of the power, information transfer and timing control applied to the system. FIG. 9 shows the transmission taking place during time interval $t_1$ and FIG. 10 during time interval $t_2$. During certain time periods the central stations search and scan for new stations or movements of stations. The central stations are not directed towards any specific peripheral station during said time periods.

Figure 12:
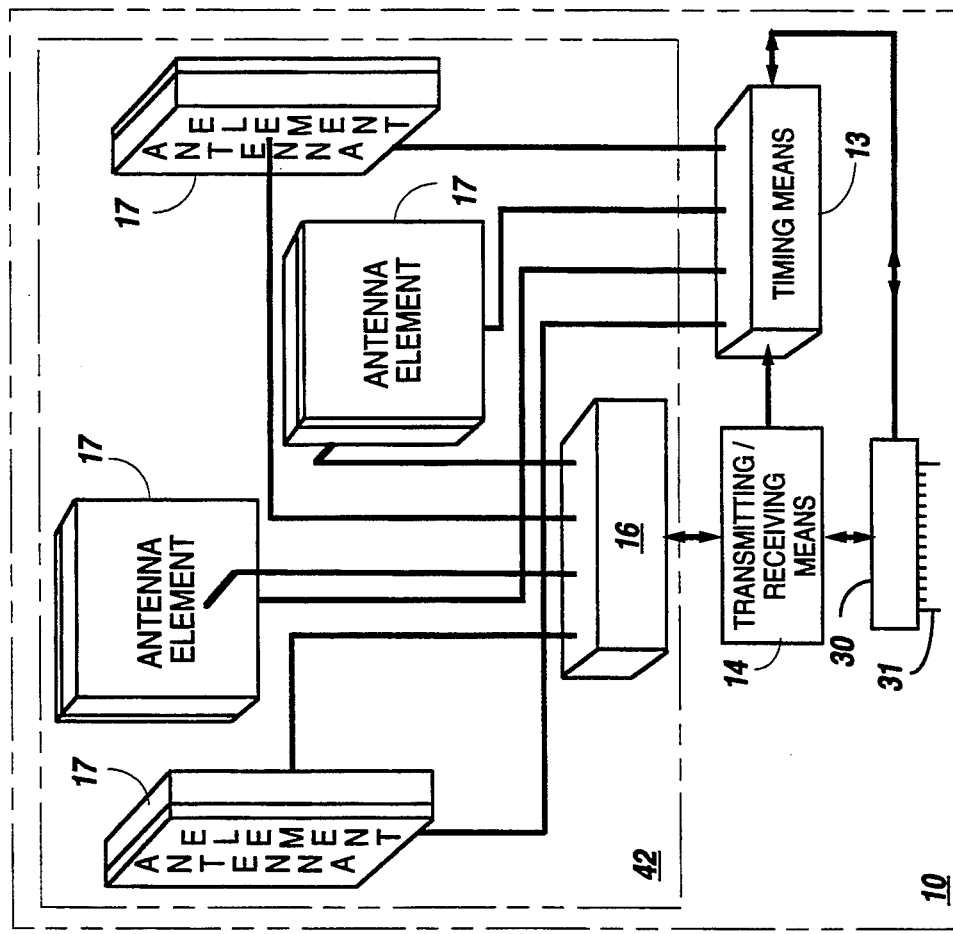
FIG. 12 shows another embodiment of the invention utilizing phase array antennas.
Figure 11:
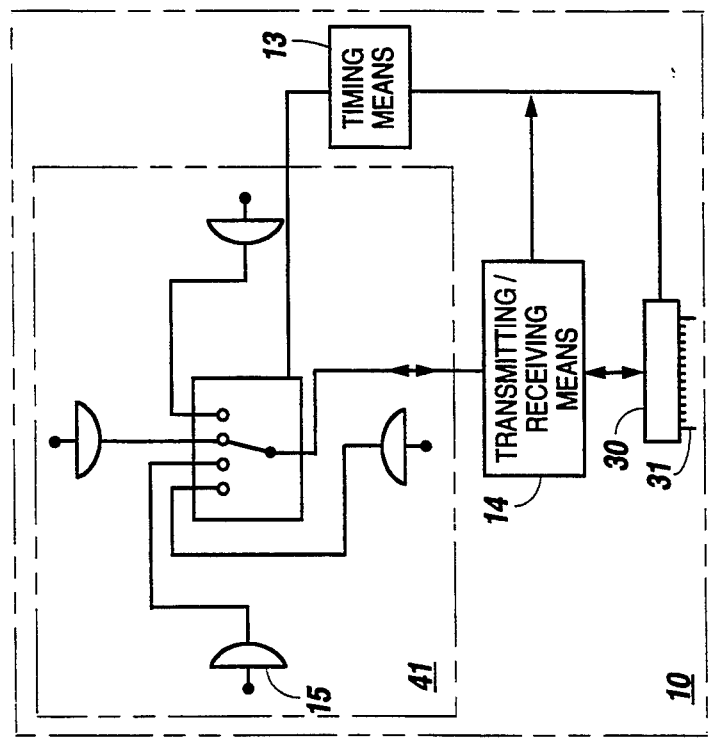
FIG. 11 shows a central station according to the invention.

The system utilizes dynamically controlled antennas 41 and the principle of this type of antennas is shown in FIG. 11. In one implementation of the system phase array antennas 42 are used, see FIG. 12. The construction of the phase array antennas depends on the application. In FIG. 12 four plane phase array antenna elements 17, each of which covers 90°, are combined so as to cover a full circle for one radio transmitter/receiver. Alternatively, one plane phase array element is combined with one transmitter/receiver in order to allow the central station to serve a sector. Each of the elements is constructed to have a well defined transmission direction in space.

Figure 21:
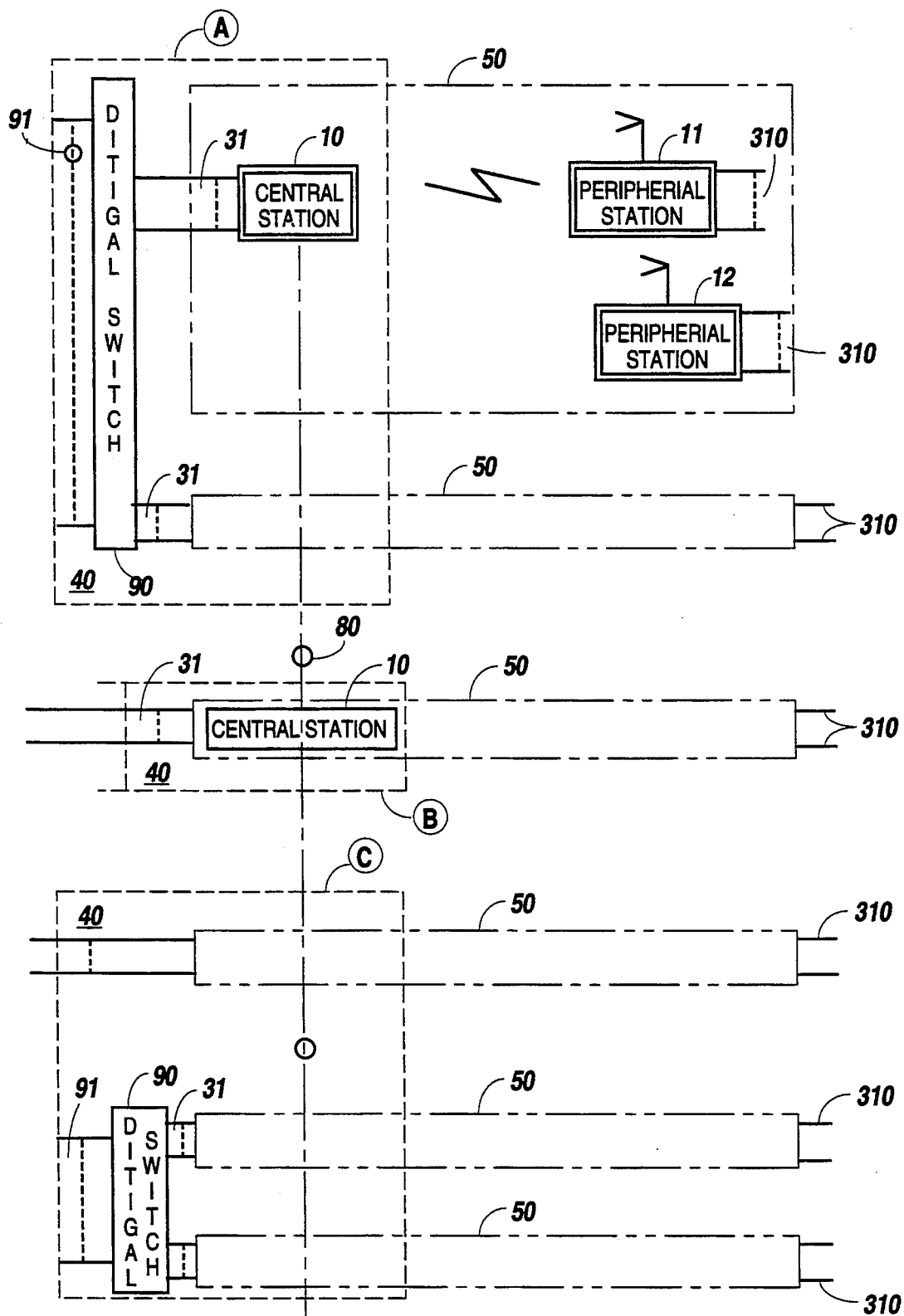
FIG. 21 is a block diagram of a system configuration.
Figure 22A:
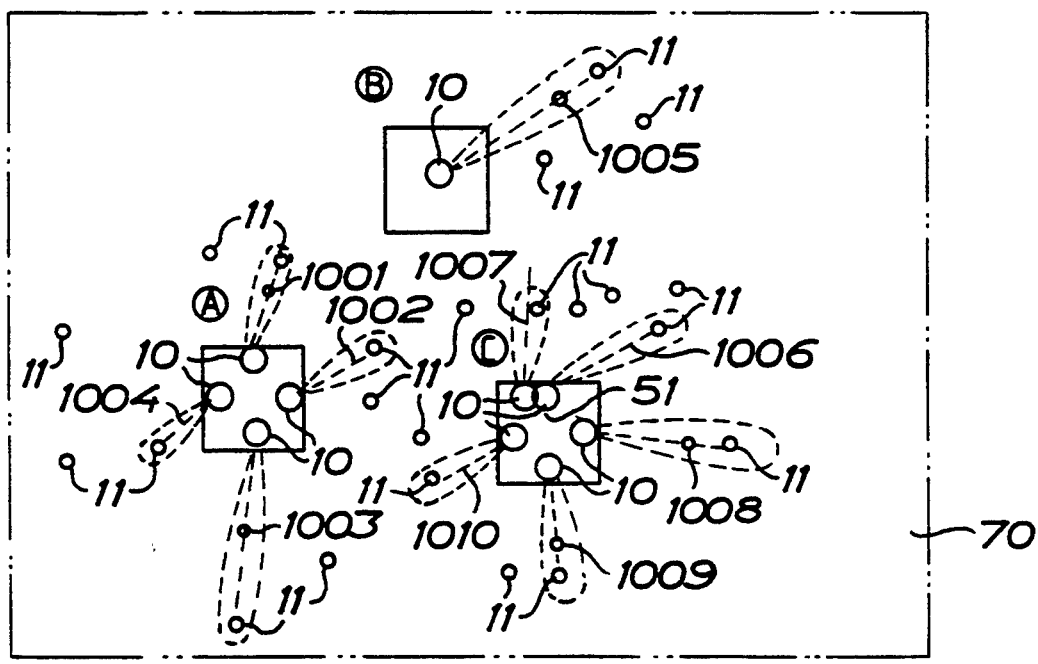
FIGS. 22A & 22B show a representation of the configuration in FIG. 21
Figure 22B:
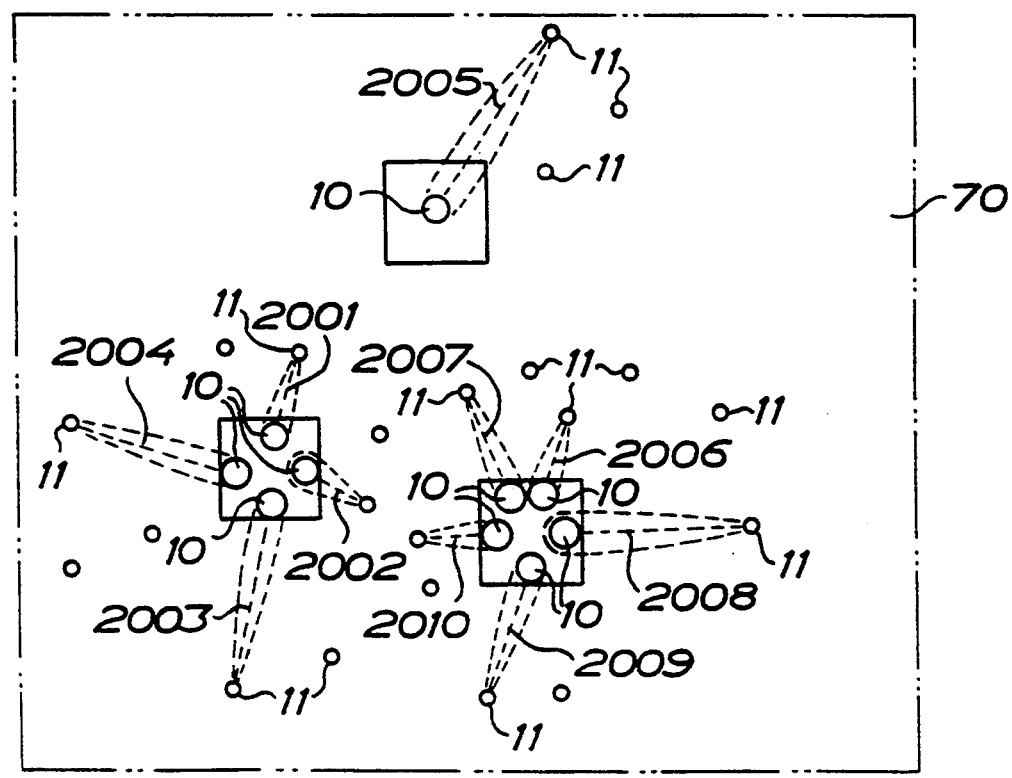

One central station 10 and the peripheral stations 11 connected thereto comprise one subsystem which combined with more subsystems forms a larger communication system that cover a principally unlimited area as illustrated in FIGS. 21 and 22. Different configuration types are possible, such as those shown in FIGS. 24, 25 and 26 with decentralized or hirarcial structures. Further, all or some of the stations may be provided with dynamically controlled directional antennas.

Figure 13:
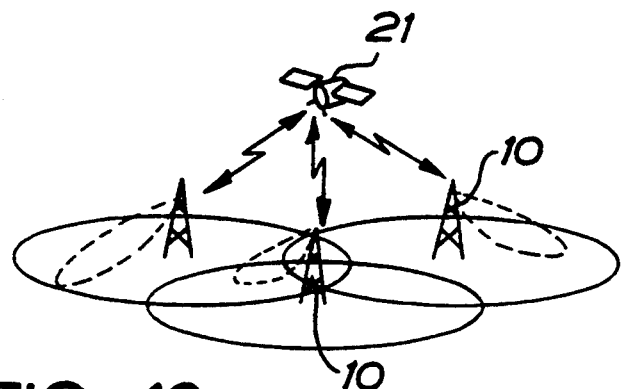
FIG. 13 is a representation of a timing synchronizing system utilized in an embodiment of the invention.

One implementation of timing control between subsystems is shown in FIG. 13 where the central stations 10 receive synchronizing signals from an external reference source and communication channel such as a satellite 21, radio/TV transmitter etc. The timing control and traffic coordination between subsystems to avoid interference could also take place through the public telephone network or through central stations which are set up to be synchronized and exchange control data with adjacent stations, 80, see FIGS. 21 and 22. Compensation for and control of time reference differences, 34, between different adjacent sites may be included in advance by compensating for the relative time difference between different geographically separated stations. Alternatively, the central stations are provided with a frame stability which makes synchronization unnecessary. If synchronization is not applied adaptive fault detection methods are used to coordinate traffic in the subsystems.

Figure 14:
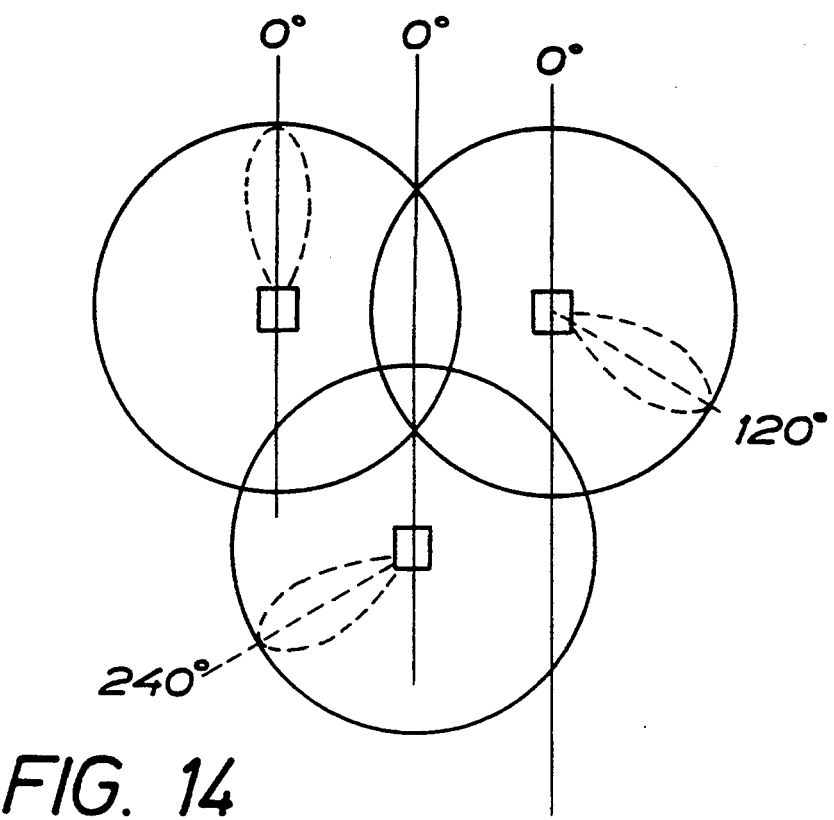
FIG. 14 is a representation of a phase displacement system utilized in an embodiment of the invention.

FIG. 14 shows a simplified arrangement to which there is applied a dynamic time slot allocation in dependence of the traffic for each central station independent of traffic analyse on other central stations. To minimize the interference between central stations the scanning beam or beams at each central station can be phase delayed and/or combined with a quality detection to perform communication as mentioned above. Thus, in this way risk of interference is minimized without a dynamic traffic coordination between none-adjacent central stations.

Figure 15A:
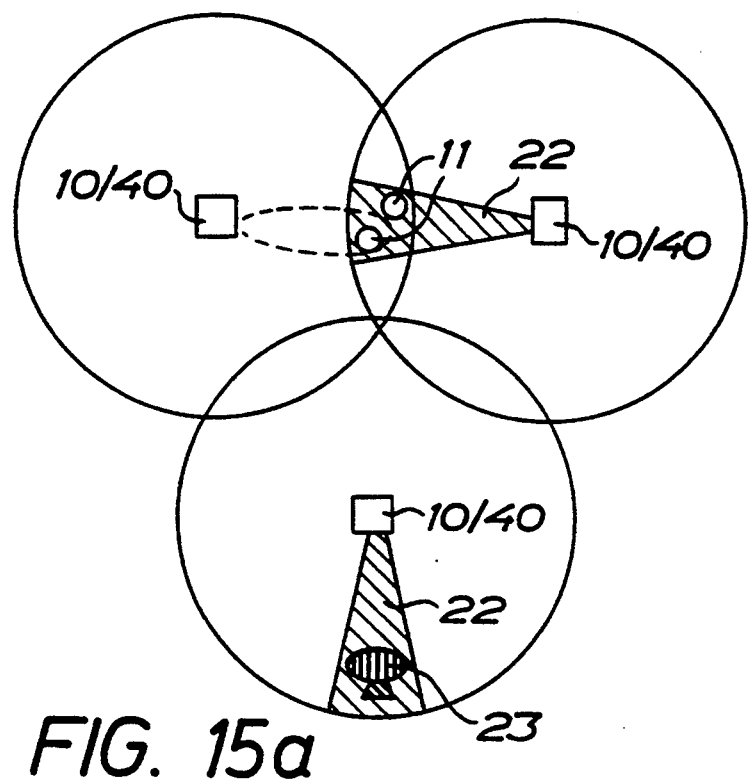
FIGS. 15A & 15B show a representation of a system according to the invention.

A way of avoiding interference between different substations is simply not to allow information exchange in some directions during some time intervals. Areas 22 in FIG. 15a are referenced as prohibited zones and no transmission is allowed in those areas. The unit giving the reference number 23 is a source of interference, which can be constant in time.

At certain time intervals a pair of station in each subsystems are bound to interfere when they transfer information at the same frequency. See FIG. 15b. Two such stations are referenced as a pair at risk. 24, 25, 26, 27, 28. However, for fixed applications pairs at risk are known in advance and the time intervals given to the stations in a pair at risk are chosen by the control system so as to minimize the risk of interference.

Figure 15B:
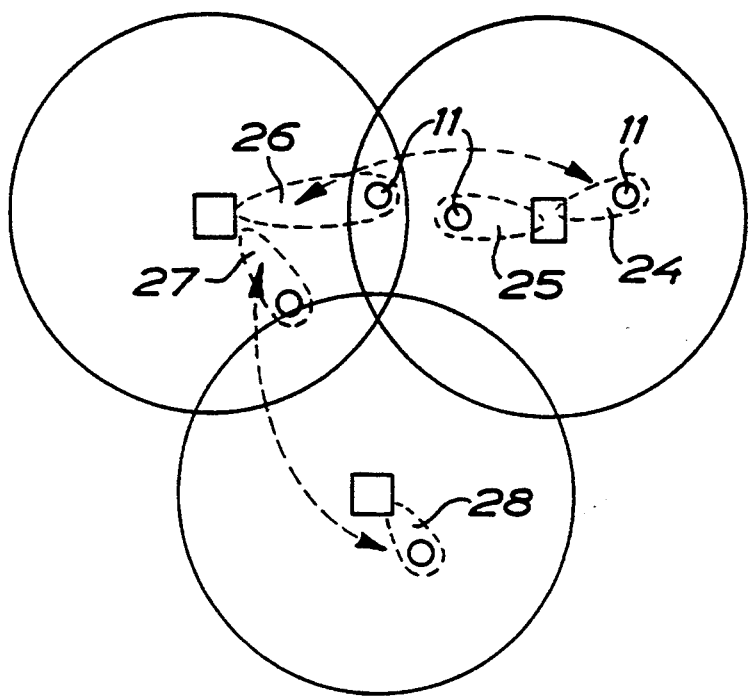

By adjusting the transmission power to a level for each station pair that exchange information to achieve a certain expected transmission quality the level of interference is minimized and the information exchange is not performed with an unnecessary high quality. FIG. 15b shows power diagrams 25, 26 for different stations situated at different distances from their central stations. In order to maintain a desired transmission quality in the system in unpredicted situations is fault detection applied. The influence from interference can be decreased by adapting forward error correction codes or by changing time slots or frequency.

Figure 16:
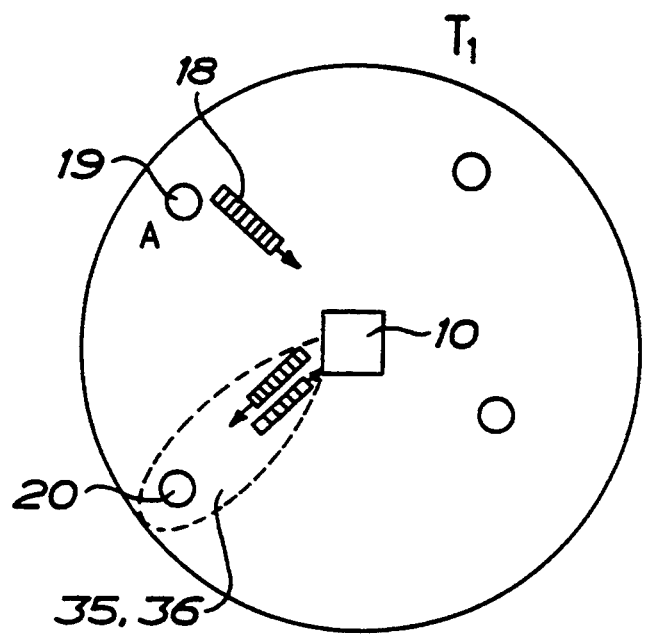
FIGS. 16, 17 and 18 are representations of a system according to the invention transmitting in duplex and semi duplex.
Figure 17:
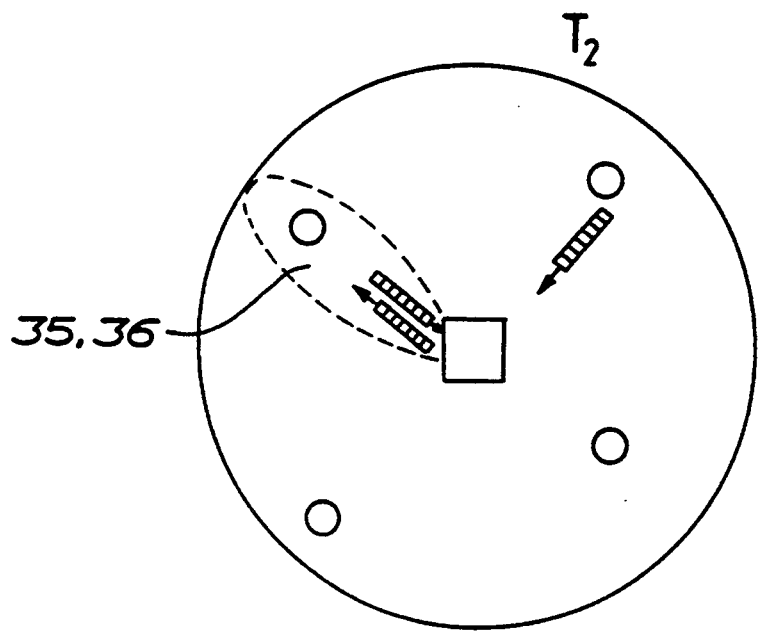

When a system according to the present invention is used for duplex transmission information packages to or from a central station are coordinated with respect to time intervals. In that way losses due to directional changes in time and capacity are minimized. FIGS. 16 and 17 show how the antenna system of one central station for one radio unit is directed in one specific direction at the time T1 and transmits and receives information packets to and from a peripheral station 20. At point T2 another packet is received at the central station from the peripheral station 19 and its corresponding packet is sent out to 19, in duplex mode.

Figure 18:
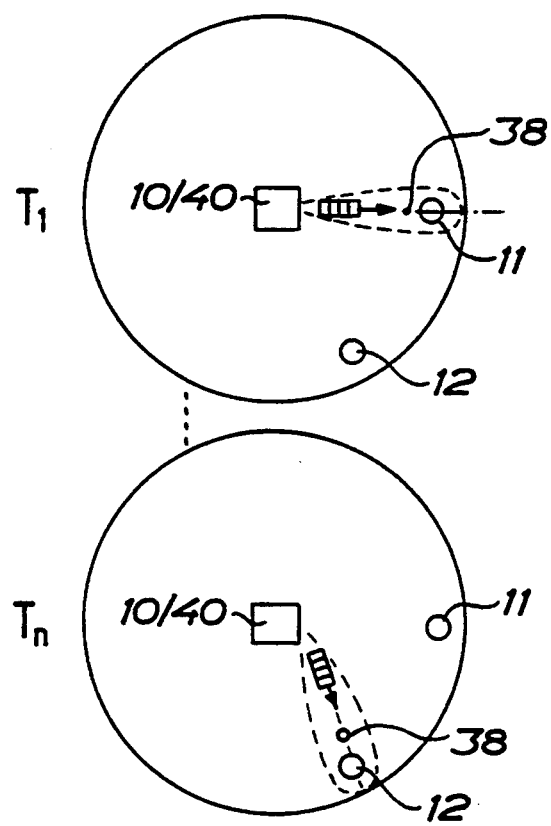
Figure 18:
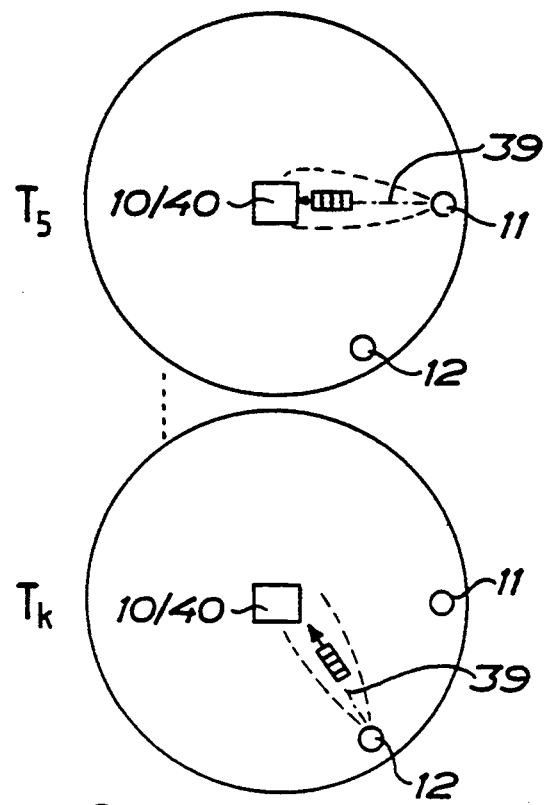

FIG. 18 shows a similar process as described with reference to FIGS. 16 and 17 but at different time slots T1, Tn, T5, Tk in semi duplex mode. The transmission process is separated between the central station and the peripheral stations as illustrated in the antenna diagram 38 and 39. 44 is the information packets sent by a central station and 45 is the information sent by the peripheral station. In semi duplex mode the central station coordinate the traffic flow to and from the peripheral stations and direct the antennas towards incoming packages from peripheral stations shortly before the information 45 is received by the antenna. Shortly after the transmission is completed the antenna is redirected. A central station controls each of the peripheral stations associated therewith with respect to the time intervals during which the peripheral station is allowed to transmit information. In that way the central station knows when information will be transmitted from each of the peripheral stations and when the information will be received. When such a package is received the antenna lobe 38 has just taken the proper direction. During the rest of the time period of each frame the central station exchanges information with other peripheral stations and in the next frame the antenna is again directed towards the mentioned station as long as the time slot is assigned.

Figure 19:
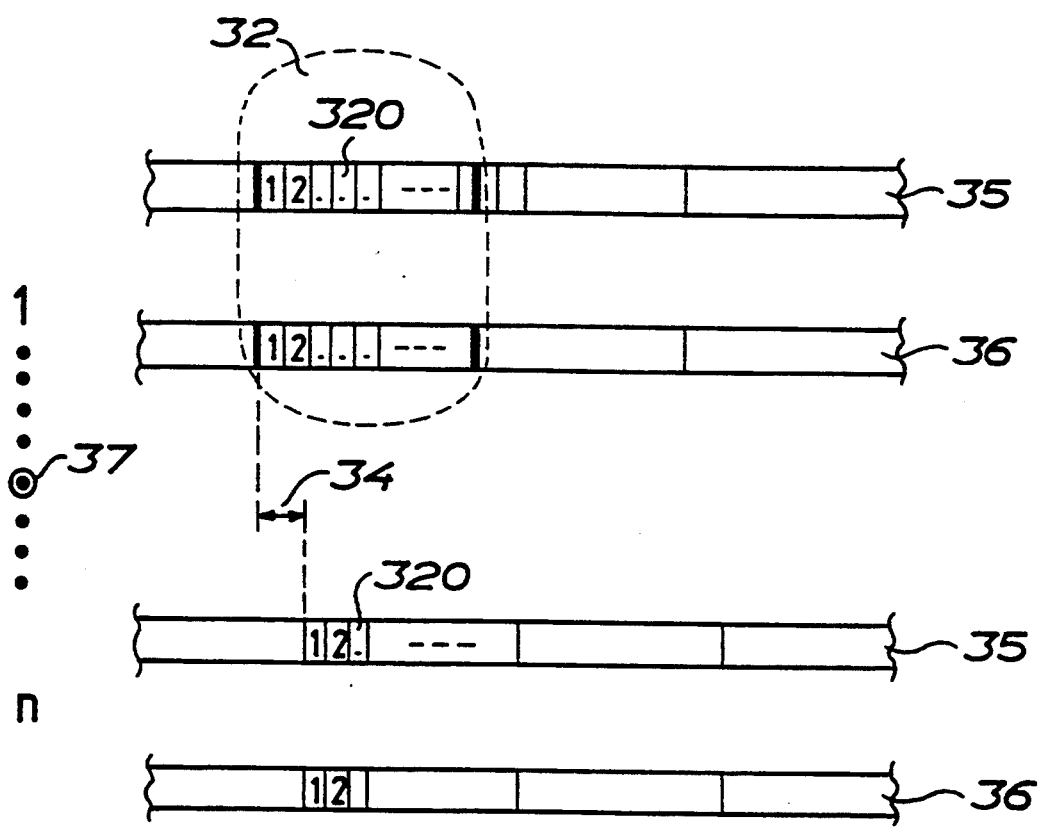
FIGS. 19 and 20 are representations of different time frames for different subsystems in duplex and semiduplex.

FIG. 19 shows the duplex frame structure for one or several central stations 1 . . . n. The transmission and receiving time are illustrated at 35 and 36. The total amount of time available during one frame is referenced by 32. One frame is devided into certain slots 320. The relative time difference between geographically separated central stations is referenced by 34.

Figure 20:
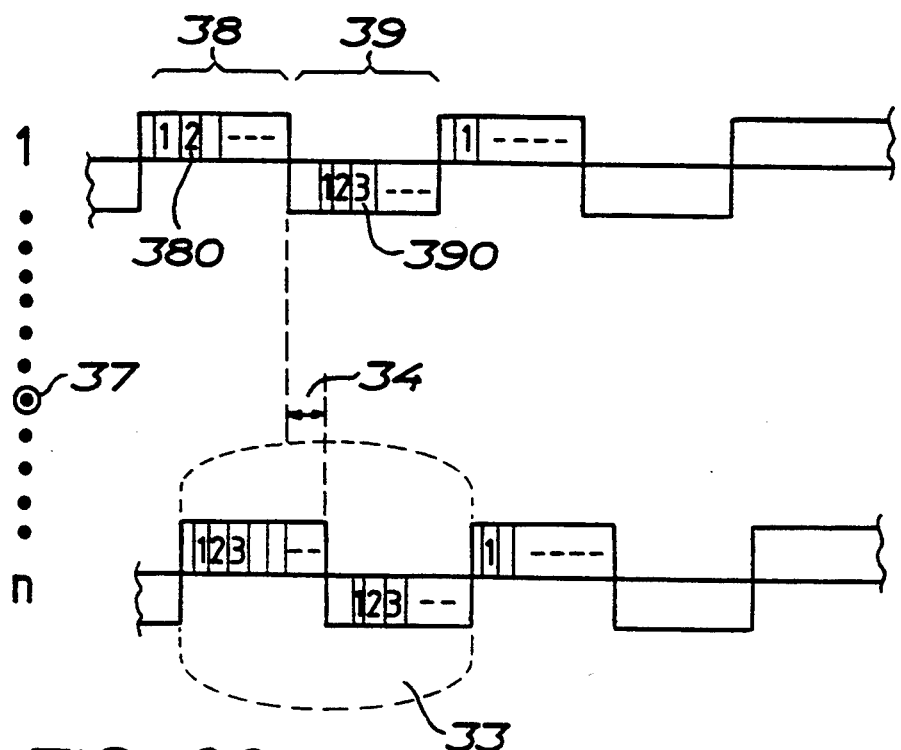

FIG. 20 shows the semi duplex mode where each subsystem or central station using the same radio carrier is separated in a transmission time for the central station and the peripheral stations 38 and 39. The total time for one frame for both directions is referenced by 33. The time slot assigment in each of the directions can be different which is shown at 380 and 390 in semi duplex mode the transmission direction to and from the peripheral stations is controlled by time slot allocation reservation which makes it possible to handle traffic of different capacity between ports in the system independently of the transmission direction. The semi duplex frame structure is separated in a transmission time period and a receiving time period in order to operate several different central stations at the same time on the same frequency, see FIG. 22, with minimized interference between subsystems. Said central stations can be adjacent or non-adjacent.

FIGS. 21 and 22 show an example of an implementation of the system over a wide area. One or several central stations 10 form subsystems 50 together with peripheral stations 11 and 12. One or several central stations can be formed as one station or super central station 40 at the same site via a digital switch. The traffic within or between different subsystems may take place through an external digital switching device 90 in order to increase redundancy or to use each super central station more efficiently. Several subsystems 50 form a system 70. Synchronisation and coordination between subsystems and inter system data exchange is shown at 80. Connection ports to other networks are represented by 31 and 91 at the central or super central stations and by 310 at the peripheral stations. Coexistance of two subsystems that cover the same region is shown in FIG. 22, c.

Figure 23:
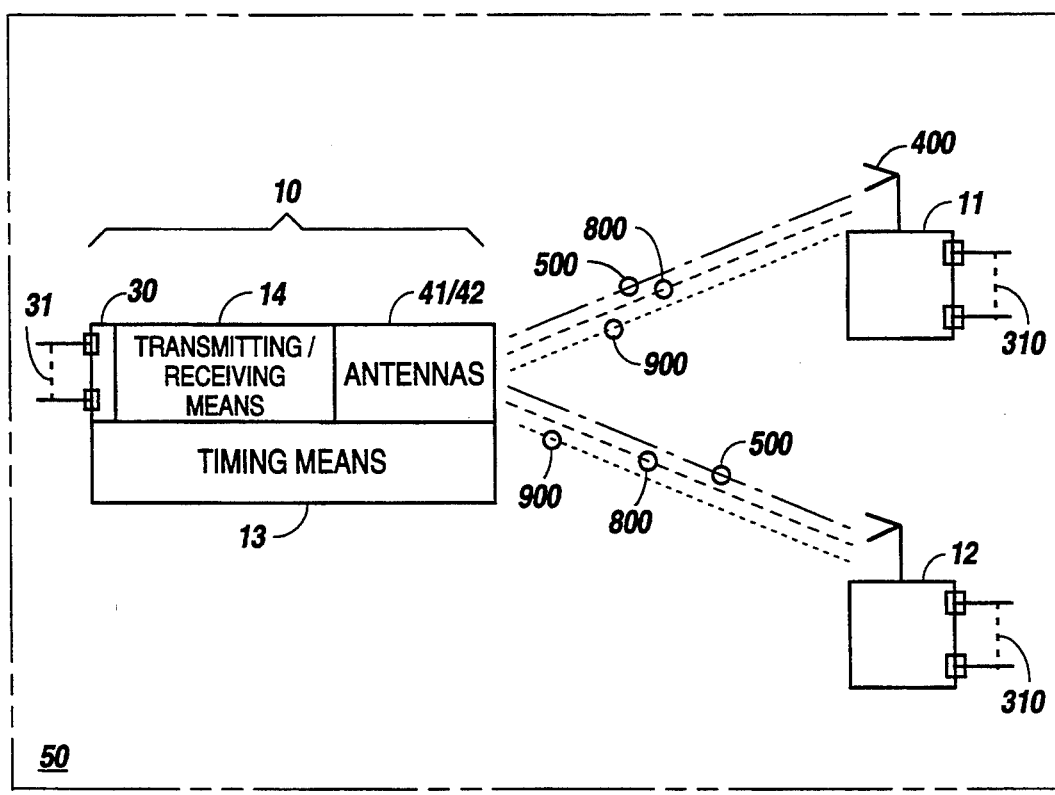
FIG. 23 is a block diagram of a sub-system.

FIG. 23 shows one subsystem 50 and under the central station 10 one or several separated peripheral stations 11 and 12 with its ports 310 where user traffic is to be connected. Use of data transmission is represented by 500. Signalling between central and peripheral stations is represented by 800 for the ports and by 900 for other signalling. Interference is further possible to minimize in the system by analysing the user information which is required to be sent through each subsystem. If so desired only information packets that carries changes or certain types of changes are transmitted through the system. When information is considered redundant and is not transmitted the information is instead reinserted at the corresponding destination port of the system. The information transfer between ports is controlled in the signalling 800 which requires less band width than usual data transfer 500. Data, such as silence or "on hook condition" in a telephone system and/or repaeted similar data streams or no data transmission from a computer, LAN, PABX, IMAGES, etc can be controlled by signalling between the stations. In this way the interference in the system is decreased. Further, the system capacity will be increased.

Figure 24:
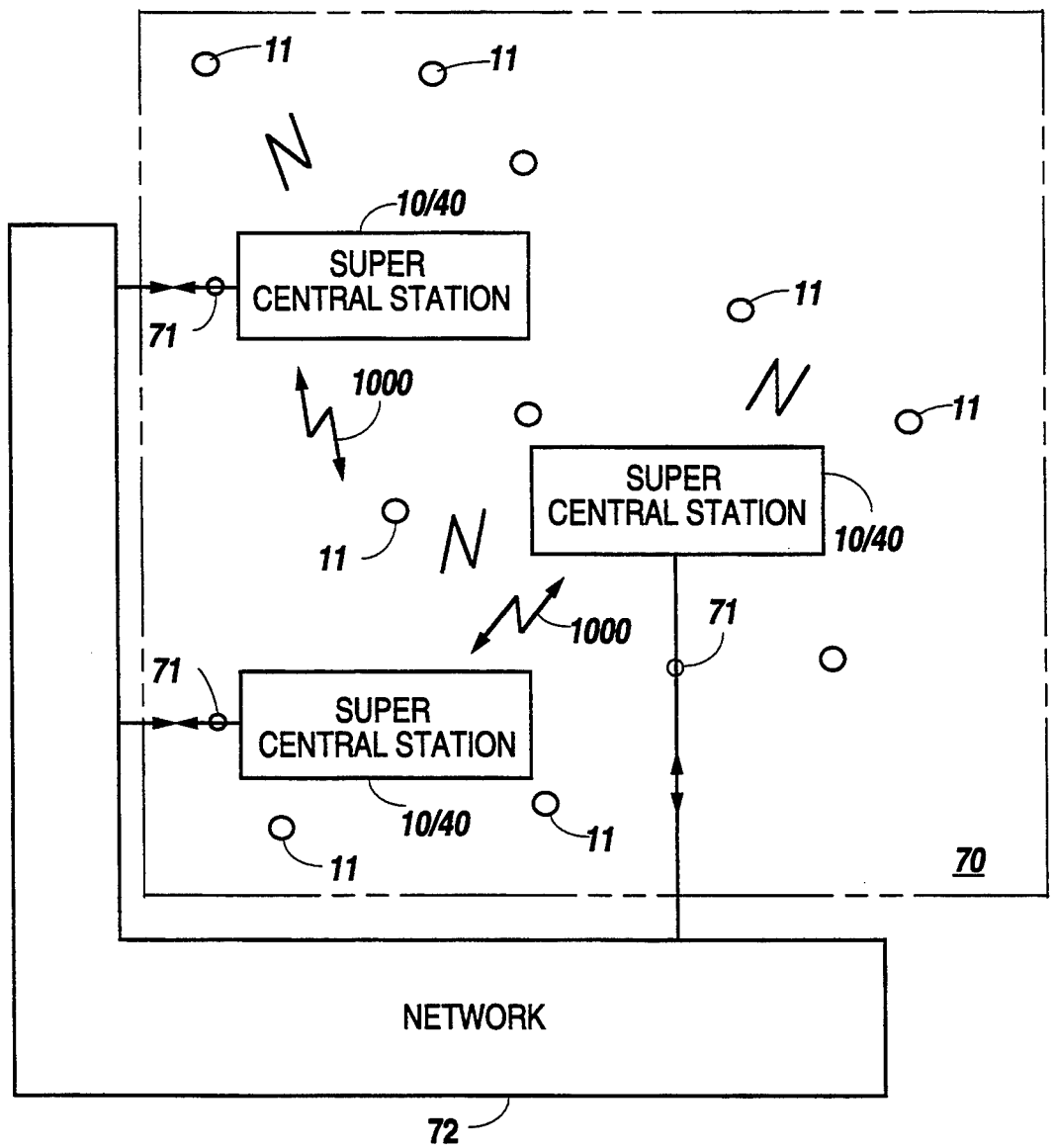
FIGS. 24 to 26 are representations of different methods of connecting systems according to the invention to external networks.
Figure 25:
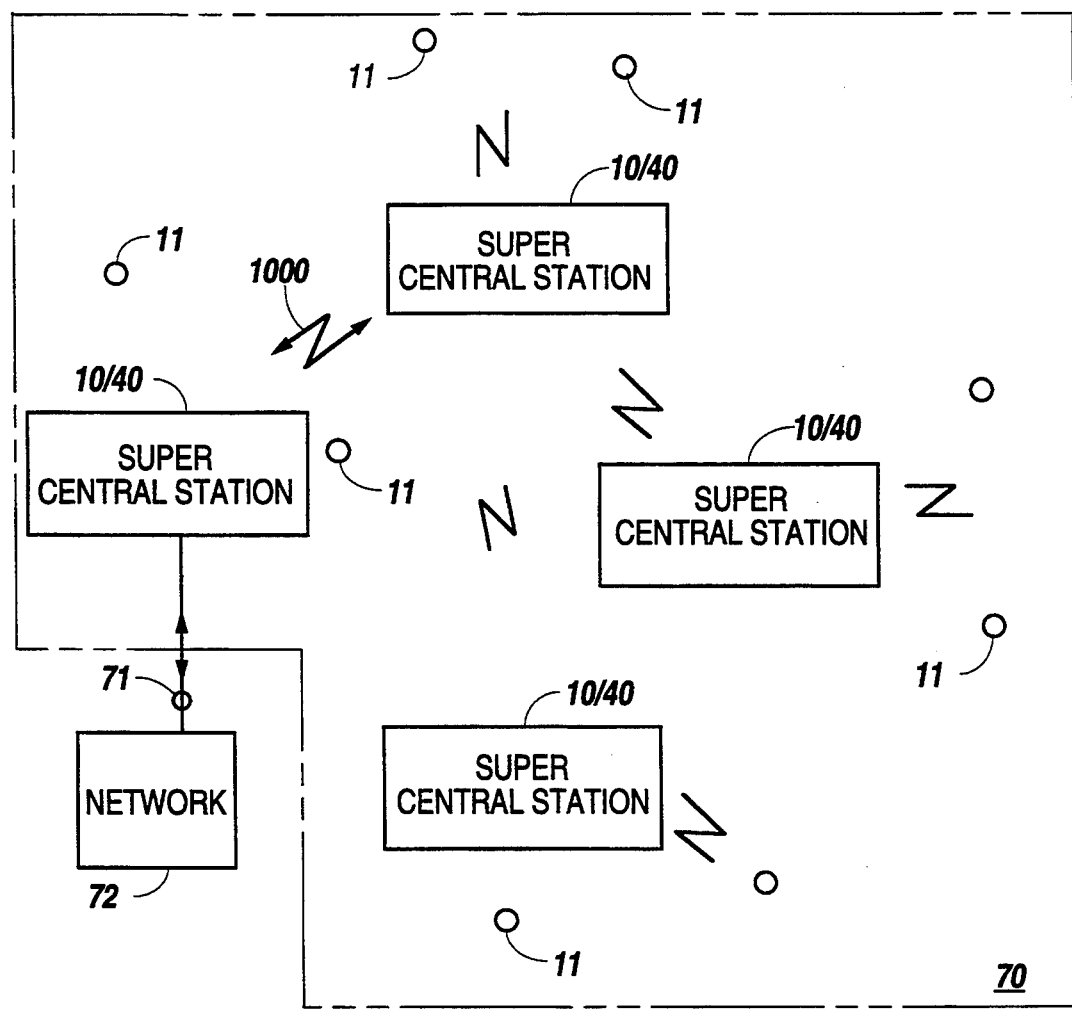
Figure 26:
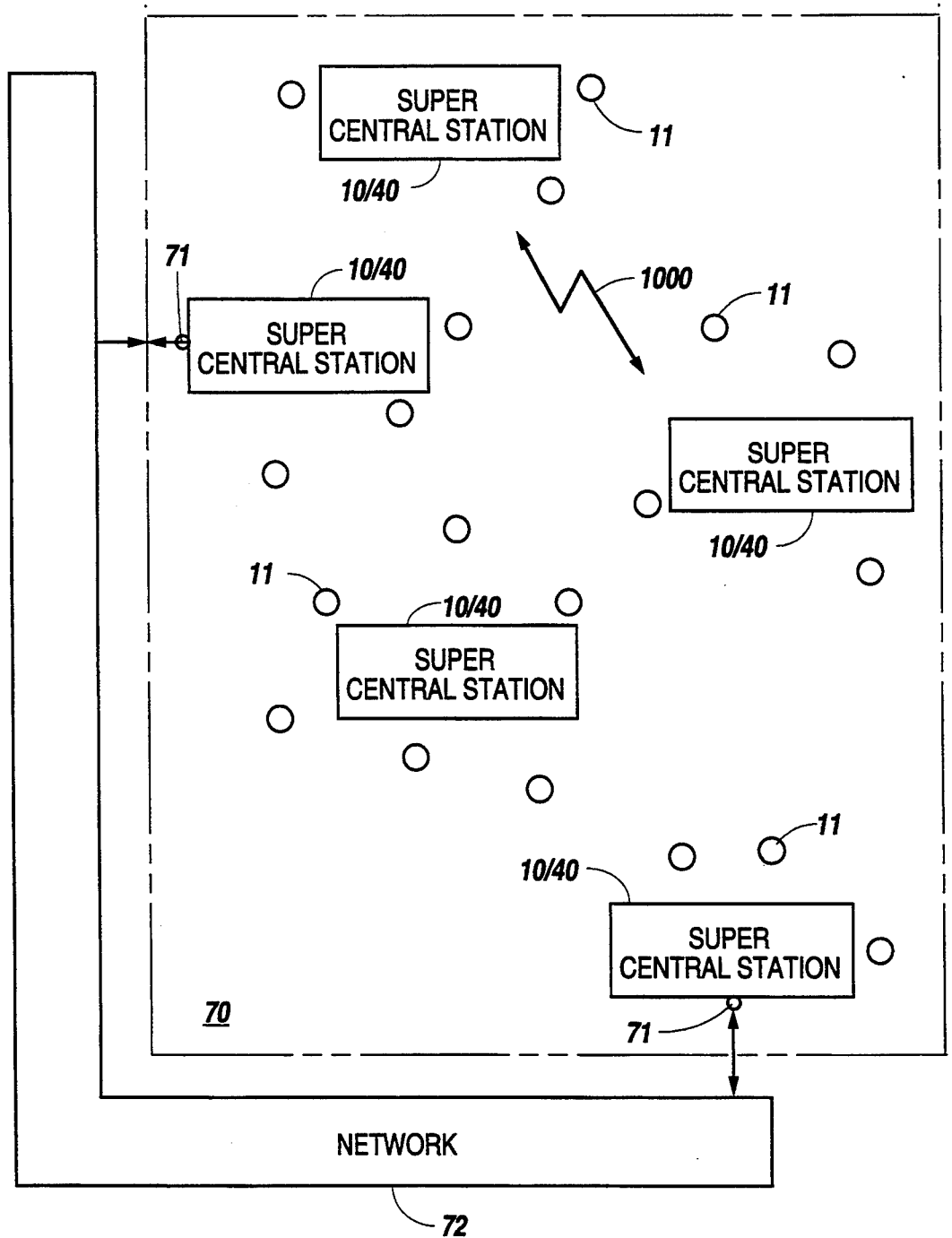

FIGS. 24, 25, 26 show examples of different system configurations. In FIG. 24 each of the super central stations or subsystems is connected to another network 72. In FIG. 25 connection to another network is made through one super central station or subsystem only, inter traffic between stations shown at 1000. FIG. 26 shows a more complex and decentralized structure where some super central stations or central stations are terminated to other networks and some are not.

Figure 1:
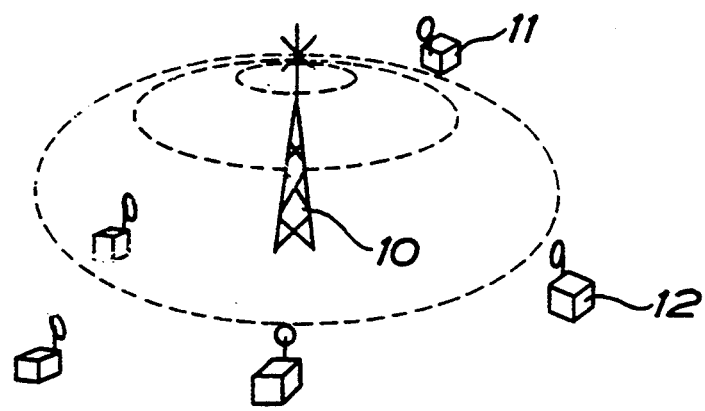
FIGS. 1–6 are representations of prior art communication systems.
Figure 2:
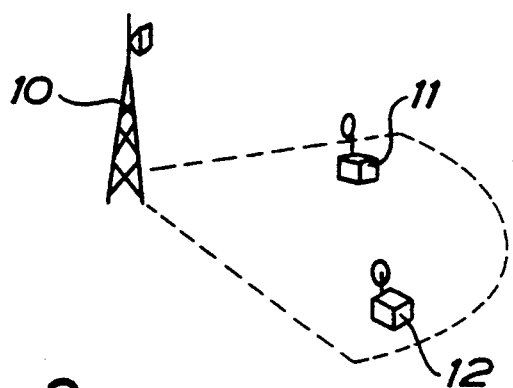
Figure 3:
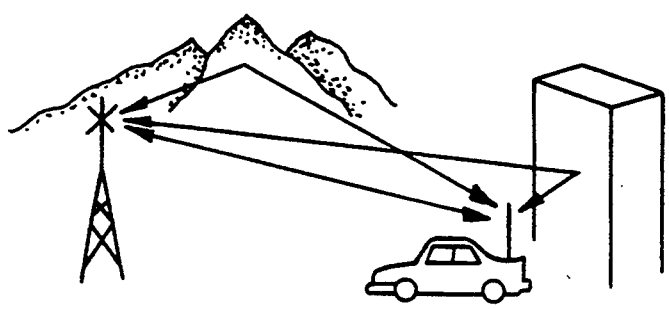
Figure 4:
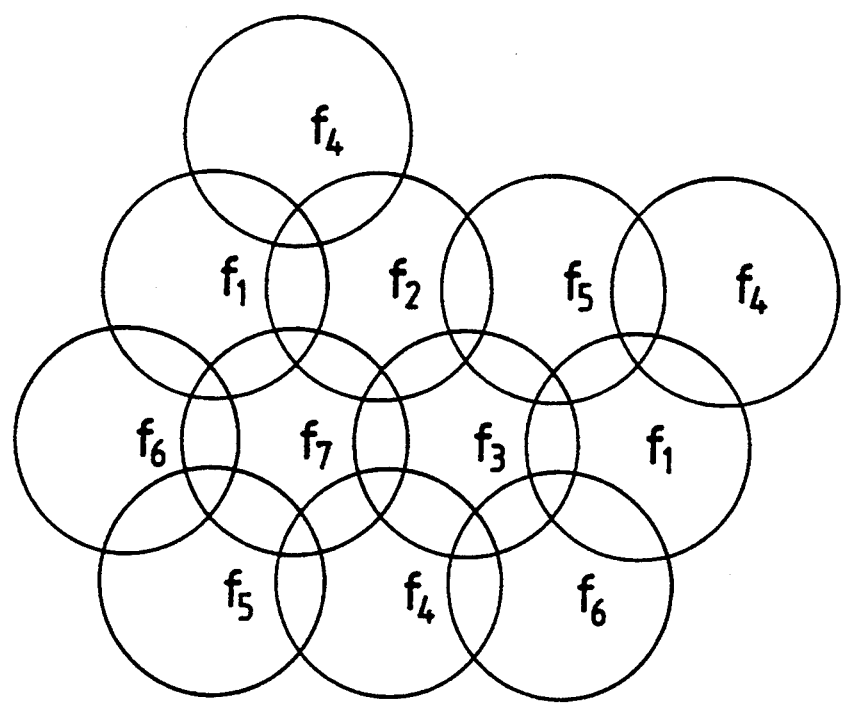

By allowing a plurality of geographically adjacent subsystems each having a possibility to cover 360° horizontally while using the same frequency, the frequency space effenciency is increased by a factor from 7 to at least 14 in relation to other methods, see FIG. 4, of wide radio, area networks. As the antenna system may also include vertical space control and as different users are separated in variable altitudes such as sky scrapes the factor is further increased.

When each central station is equipped with an antenna each covering a sector of 90° horizontally the frequency efficiency is still further improved by a factor of about 4 when interferance is controlled efficiently. If such an arrangement includes two or more systems to cover the same area from the same site 51 the efficiency is still further improved. Each central and peripheral station is equipped with ports that allow multiplexed or unmultiplexed digital signals to be transmitted through the system. The ports 31; 91; 310 form the connection points between the users and the system. Said ports are designed in such a way that it is possible to achieve a secure and if required a compressed information exchange through the system for each service connected. This is done in order to avoid interference and to delete unnecessary information transfer which at some time intervals carries no significant data, see FIG. 23. This further improves the frequency efficiency and the interference risks are further decreased.

The secrecy of the system according to the present invention is also improved dramatically when information is transmitted in packages in different directions. By adjusting the transmission intensity in dependence of the actual traffic and quality needs the secrecy is further improved.

We claim:

1. A method of communication in a wide area radio communication network, said network comprising at least two central stations, each central station being assigned to at least one peripheral station, each central station and each peripheral station having means for transmitting radio energy and receiving radio energy, means arranged in said central stations for communicating to and from said central stations radio signals in predetermined transmission directions during predetermined time intervals, said means for communicating including a directed antenna system, each central station transmitting and receiving radio signals to cover a service area, said method including the steps of:
    (a) dividing a total service area coverage of each central station into different geographical sub-service area segments covered during selected time segments;
    (b) operating each central station in different sub-areas by controlling said directed antenna system to operate in said sub-service area segment during predetermined time intervals;
    (c) storing in each of said central stations information about distance and direction to each assigned peripheral station;
    (d) distributing from each central station to each assigned peripheral station coordination signal information, said information including timing compensation with respect to the distance between said central station and said peripheral station assigned thereto, and including actual time intervals selected by said central station for sending information to said central station from said peripheral station; and
    (e) coordinating in each central station reception of information transmitted from each assigned peripheral station at said time intervals by directing during said time intervals the antenna of said central station towards said peripheral station.

2. The method according to claim 1 further including the step of communicating signals organized in a time division structure consisting of a time frame structure which is subdivided into a plurality of time slots, between each of said central stations and other stations.

3. The method according to claim 2, further including the step of in each peripheral station adjusting, within selected time slots to be used for the communication between a central station and each assigned peripheral station the transmission time with respect to the distance between said stations, to maintain said time frame structure.

4. The method according to claim 1, further including the step of optimizing with respect to a combination of optimum radio signal strength and minimal disturbance, the transfer of radio signals through the antenna systems of said central station.

5. The method according to claim 1, further including the step of directing an antenna lobe of a directed antenna system towards the antenna systems of said central station.

6. The method according to claim 1, further including the step of applying error detection measures to information transferred between each central station and any assigned peripheral station, in order to measure transmission quality.

7. The method according to claim 6, further including the step of correcting detected errors by redirecting said directed antenna systems to improve transmission quality between said central station and assigned peripheral station.

8. The method according to claim 6, further including the step of initiating a change of time slot selection in the communication between respective central station and assigned peripheral station when errors are detected.

9. The method according to claim 6, further including the step of initiating a change of frequency when errors are detected.

10. The method according to claim 6, further including the step of initiating application of error correction measures when errors are detected.

11. The method according to claim 1 wherein signals transferred between each central station and any peripheral station include elements for error correction.

12. The method according to claim 2, further including the step of synchronizing the time frame structure of a first central station and the time frame structure of a second central station.

13. The method according to claim 1, further including the step of controlling the level of transmitted radio energy from at least said central station to its assigned peripheral station to achieve a predetermined level of transmission quality.

14. The method according to claim 2, further including the step of utilizing a common frequency band for all stations for providing radio capacity to each central station and its associated peripheral station time frames of each central station and its assigned peripheral station being separated into more than one time slot, and each frame being separated in a send and a receive time interval, each of said time intervals representing a consecutive number of time slots.

15. The method according to claim 1 wherein said peripheral station is stationary during communication with said central station.

16. The method according to claim 1 wherein said peripheral station is movable during communication with said central station.

17. The method according to claim 1, further including the step of coordinating said division of a service area of a first central station into different geographical subservice area segments in selected time segments and a corresponding division in a second central station to avoid interference, said first and second central stations having overlapping service areas and utilizing overlapping frequency bands.

18. The method according to claim 2, further including the step of using different separate frequency bands for transmitting and receiving, respectively, radio signals in each central station and each peripheral station.

19. The method according to claim 1, further including the step of storing said distributed information including timing compensating data and time intervals in said peripheral station receiving said information.

20. A system for communicating in a wide area radio communication network, said network comprising at least two central stations, and a plurality of peripheral stations, each central station being assigned to at least one peripheral station, each said central station comprising:
   means for transmitting and receiving radio signals to and from any assigned peripheral station assigned thereto, said means including a controllable directional antenna system,
   means for controlling said directional antenna system in specific directions during selected specific time segments in at least two directions,
   means for storing position data including distance and direction to at least said associated peripheral station; and each of said peripheral stations comprising:
   means for transmitting and receiving radio signals to and from any associated central station,
   means for receiving timing information and distance information, and
   means for storing said timing and distance information in each peripheral station for controlling the timing of transmitting radio signals to said central station on the basis of said timing and distance information.

* * * * *